United States Patent [19]

Vachon

[11] Patent Number: 4,778,195

[45] Date of Patent: Oct. 18, 1988

[54] TRACTOR WORK IMPLEMENT COUPLER

[76] Inventor: Bertrand Vachon, 2815, chemin de l'aéroport, Thetford Mines, Quebec, Canada, G6G 5R7

[21] Appl. No.: 20,386

[22] Filed: Mar. 2, 1987

[51] Int. Cl.$^4$ .............................................. B60D 1/00
[52] U.S. Cl. ..................................... 280/477; 280/481
[58] Field of Search ................... 280/481, 477, 479 R, 280/479 A, 415 R; 172/272, 273, 274, 275

[56] References Cited

U.S. PATENT DOCUMENTS

| | | | |
|---|---|---|---|
| 3,091,352 | 5/1963 | Vitable | 280/477 X |
| 3,151,885 | 10/1964 | Johnson | 280/477 |
| 3,659,362 | 5/1972 | Bell | 280/481 |
| 4,178,011 | 12/1979 | Kirsch | 280/477 |

FOREIGN PATENT DOCUMENTS

| | | | |
|---|---|---|---|
| 2333141 | 1/1975 | Fed. Rep. of Germany | 280/477 |
| 1147442 | 11/1957 | France | 280/467 |

*Primary Examiner*—John A. Pekar

[57] ABSTRACT

A tenon-and-mortise coupler for releasably connecting any type of work implement to the front chassis of any conventional tractor. The tenon part defines an open frame, fixedly secured at its rear end to the front bottom of the tractor chassis, and tapered at its front end. The mortise part defines a hollow tapered casing, fixedly secured at its small end to the bracket assembly of the work implement and frictionally engageable by the tenon tapered end at its opposite large open end or mouth. A manually-operated lever is transversely mounted in the tenon part and defines an intermediate offset section carrying a longitudinally-extending latch bar, which is guided for combined longitudinal and vertical movement between a forward and lowered retracted position and a rearward and upper latching position. The tenon-and-mortise parts are first assembled with the latch bar in retracted position. Then the lever is rotated to bring the latch bar in latching position in which it engages the rear end of a slot made in the top wall of the mortise part. A compression spring is located between the lever and the latch bar to constantly bias the latch bar against the rear end of the slot in order to prevent any play between the tenon and mortise parts.

8 Claims, 5 Drawing Sheets

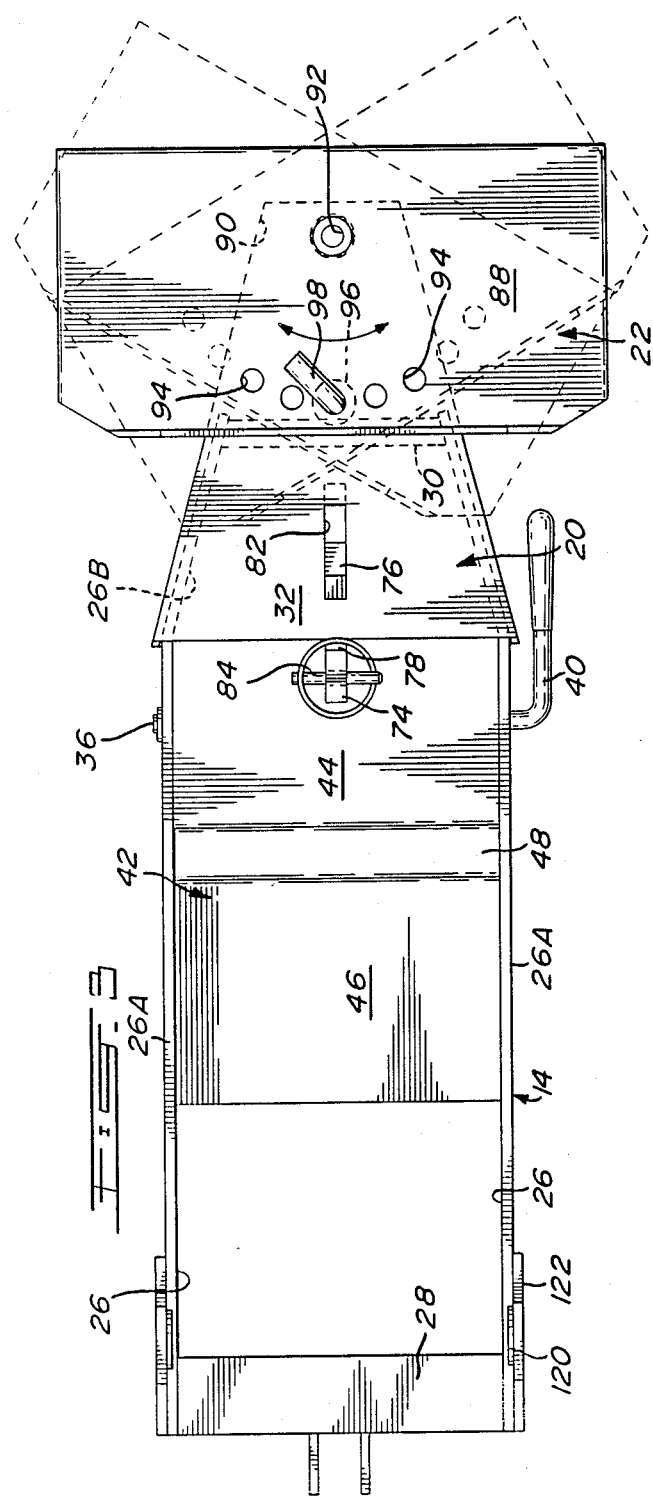

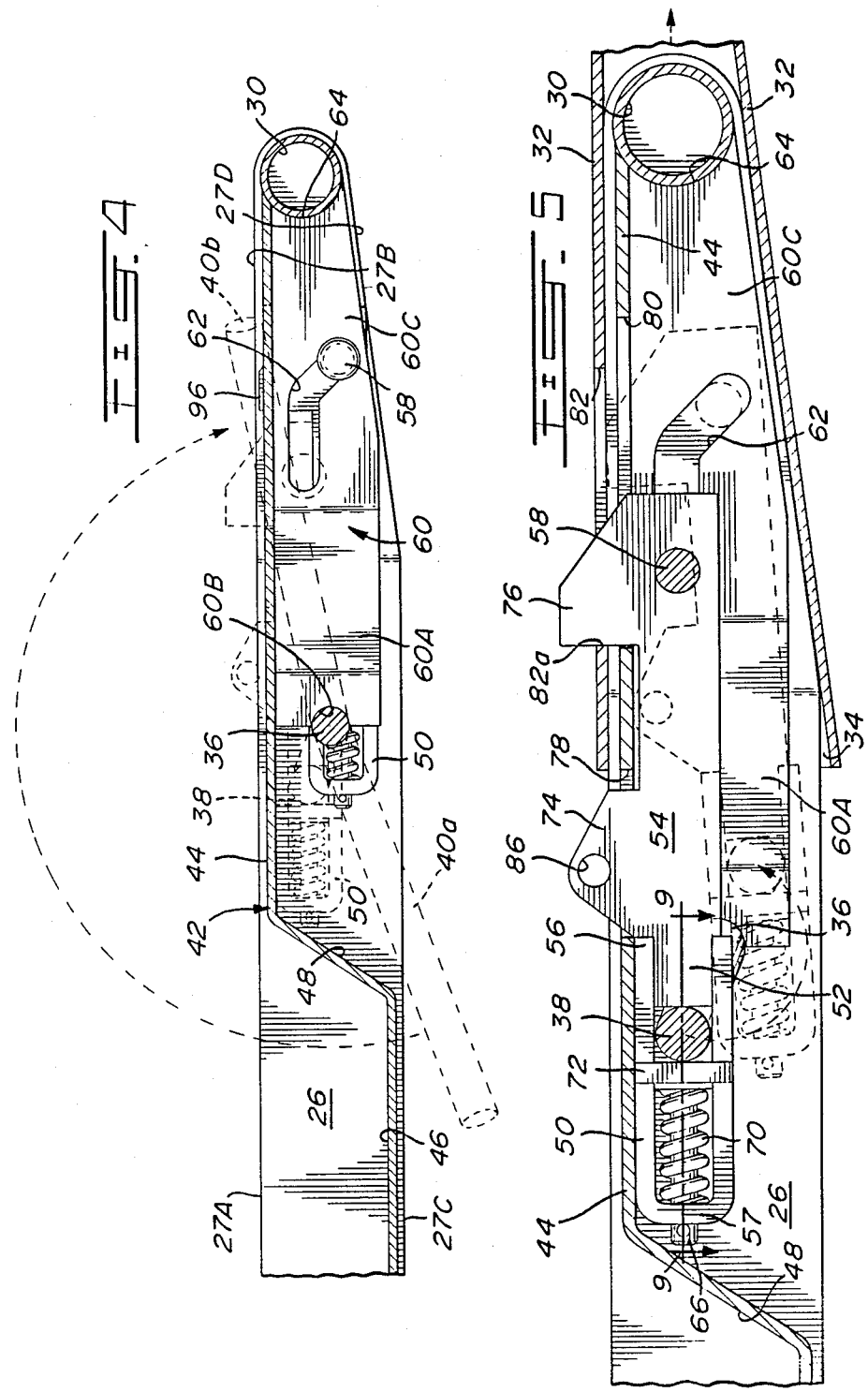

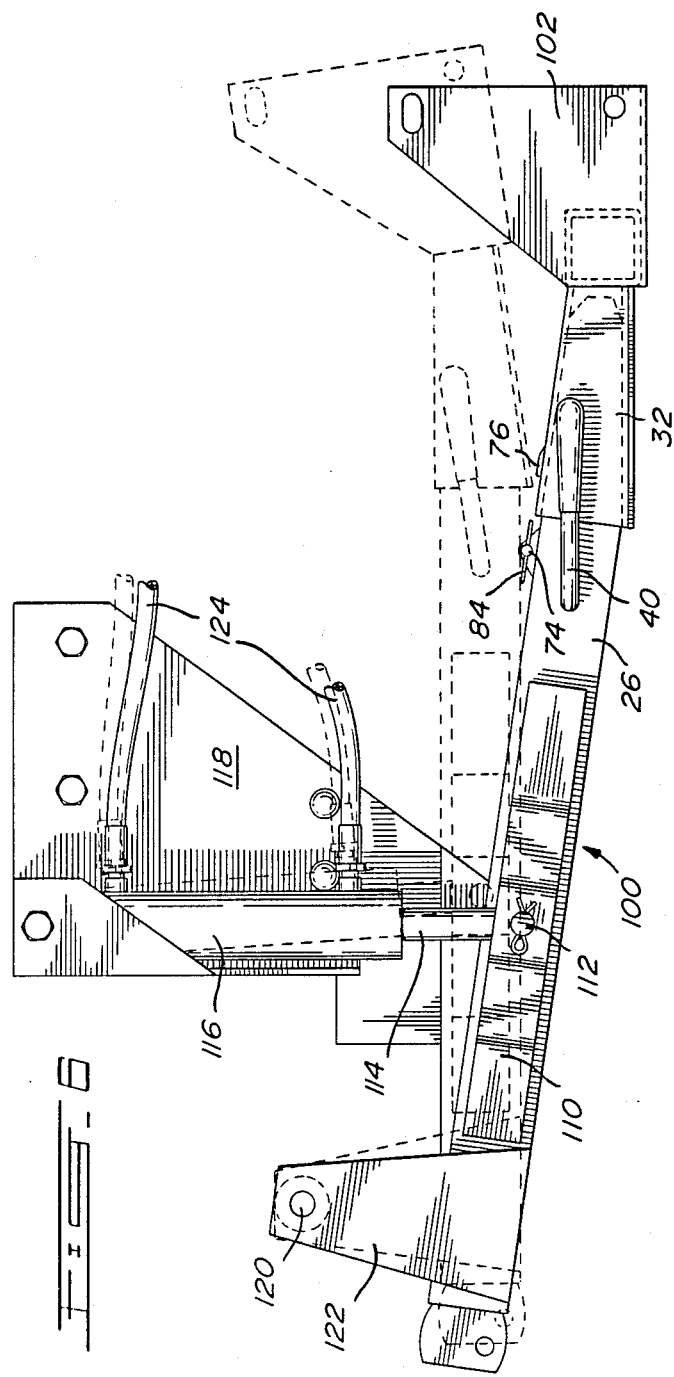

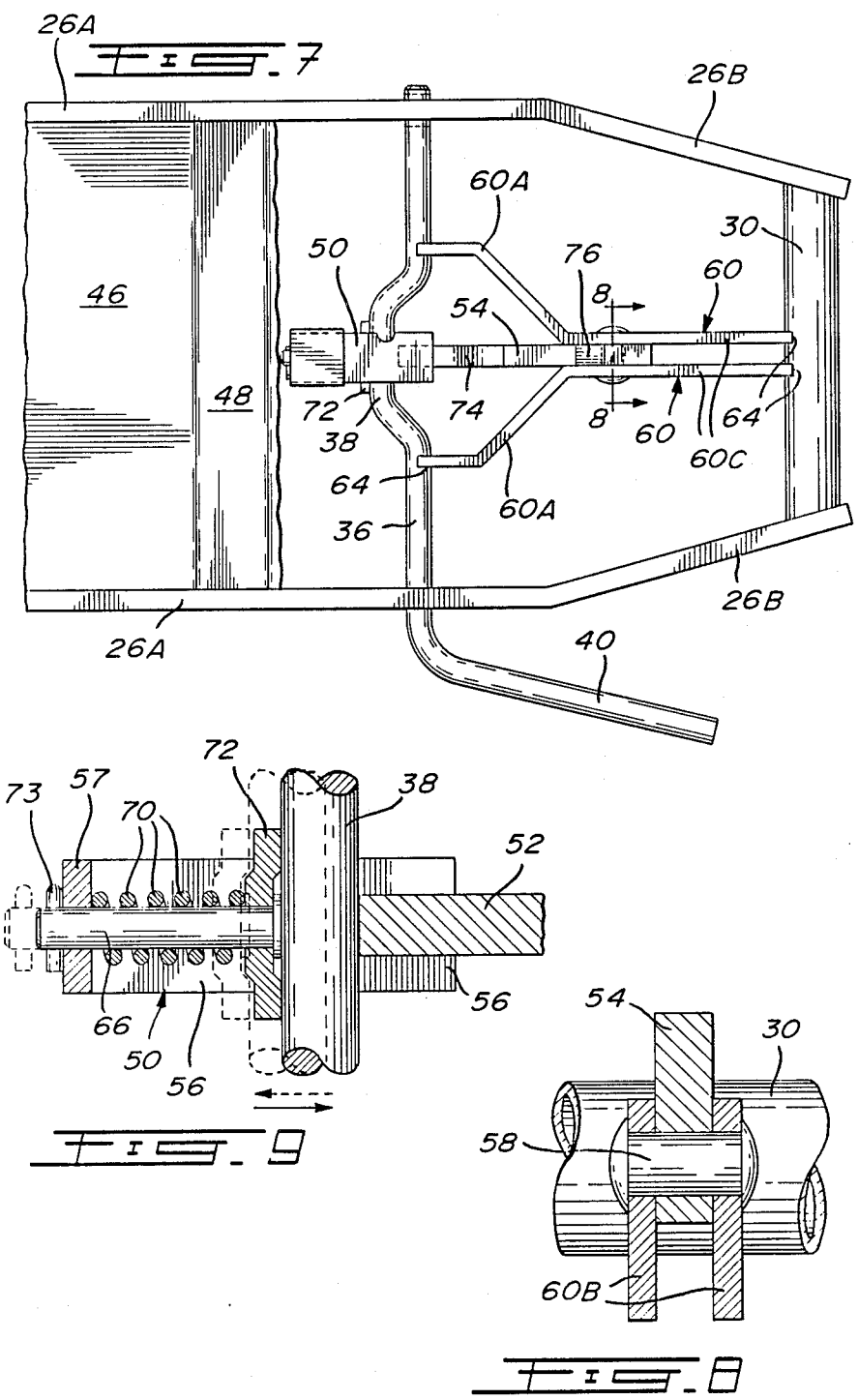

TRACTOR WORK IMPLEMENT COUPLER

FIELD OF THE INVENTION

This invention pertains to universal type couplers for connecting a work implement to the front of a tractor.

BACKGROUND OF THE INVENTION

It is known to provide a front frame attachment to a tractor, so as to secure a work implement for industrial or agricultural applications, or for lawn care. Such attachments do, however, have several drawbacks:

(1) for their installation on the tractor, they require at least two persons: one driving the tractor, the other adjusting the tractor attachment hitch to the implement bracket assembly;

(2) it is a safety hazard for a person to be manipulating the attachment member between the implement and the tractor with the tractor driver displacing the tractor, especially when the tractor driver is inexperienced;

(3) they are usually made in view of connection with a specific tractor and/or implement, and accordingly, each time one implement has to be replaced by another, the attachment member must be changed as well; this is, of course, time consuming and tiring for the operator;

(4) when one considers that the attachment member that interconnects the work implement to the tractor may cost up to half that of the implement per se; it can be understood that it is highly cost-inefficient to require a plurality of such attachment members corresponding to the number of implements used.

OBJECTS OF THE INVENTION

The main object of the invention is to provide a coupler of the universal type, capable of releasably interconnecting any one of a wide variety of work implements to most conventional farm and industrial tractors, lawn and garden tractors, and the like vehicles.

An object of the invention is to simplify the process of connection of a work implement to a tractor front end chassis.

An object of the invention is to reduce the time required for the process of replacing one work implement for another.

An object of the invention is to provide such a coupler which requires only one operator to uncouple a given implement as well as to couple an alternate implement to the vehicle.

Accordingly, an important object of the above coupler is to substantially decrease the safety hazards related to the above-noted uncoupling and coupling operations.

Another object of the invention is to decrease the ratio of the price of the above-mentioned coupler to the price of any one of many implements relative to the corresponding ratio for conventional front tractor mounting means.

SUMMARY OF THE INVENTION

A coupler for connecting a work implement to the front portion of a tractor, comprising: a tenon part and a mating mortise part both parts are preferably of rectangular cross-section; said mortise part consisting of a hollow width and thickness-tapered open casing defining a mouth at the larger rear end and a smaller opposite front end which is adapted to be attached to said work implement or to said tractor; said tenon part defining a main opened rigid frame having one tapered front end engageable into said tapered casing to a coupled position, the rear end of said tenon part adapted to be fixedly secured to the other one of said work implement or of said tractor. Latching means are provided to latch said tenon member within said mortise member in the coupled position of the same. Spring means are further provided, which act on the latching means to cause the latter to bias the tenon member and mortise member in coupled position. The latching means preferably comprise transversely journalled to said tenon frame and defining an intermediate offset section and an outwardly-projecting handle, a rigid latch bar carried by the offset lever section for translation of the latch bar by said offset section during rotation of said pivot lever handle, between a latching and an unlatching position. The latch bar is guided in the tenon part for combined longitudinal and vertical movement. During latching, the bar moves rearwardly upwardly, so as to engage a slot made in the top wall of said mortise casing and, finally, abuts the rear end of said slot. Preferably, the spring means consist of a compression spring located between said offset lever section and said latch bar.

BRIEF DESCRIPTION OF THE DRAWINGS

FIG. 3 is an enlarged top plan view of the first embodiment of coupler and associated bracket assembly of FIG. 1;

FIG. 4 is a longitudinal sectional view of the tenon portion of both embodiments of the invention, showing in dotted lines the alternate positions of the movable elements;

FIG. 5 is a longitudinal sectional view of the tenon-and-mortise portions of both embodiments of the invention, in their operative interlocked condition;

FIG. 6 is a side elevation of the second embodiment of the assembled tenon-and-mortise portions and associated adjacent elements showing the relative play of the assembly under hydraulic control;

FIG. 7 is an enlarged fragmentary top plan view of the tenon portion of the coupler, its top wall being partly broken to clearly shown the pivotal locking lever;

FIG. 8 is an enlarged cross-sectional view taken along line 8—8 of FIG. 7; and

FIG. 9 is a partial plan section taken along line 9—9 of FIG. 5.

DETAILED DESCRIPTION OF THE EMBODIMENTS OF THE INVENTION

Figure 1:
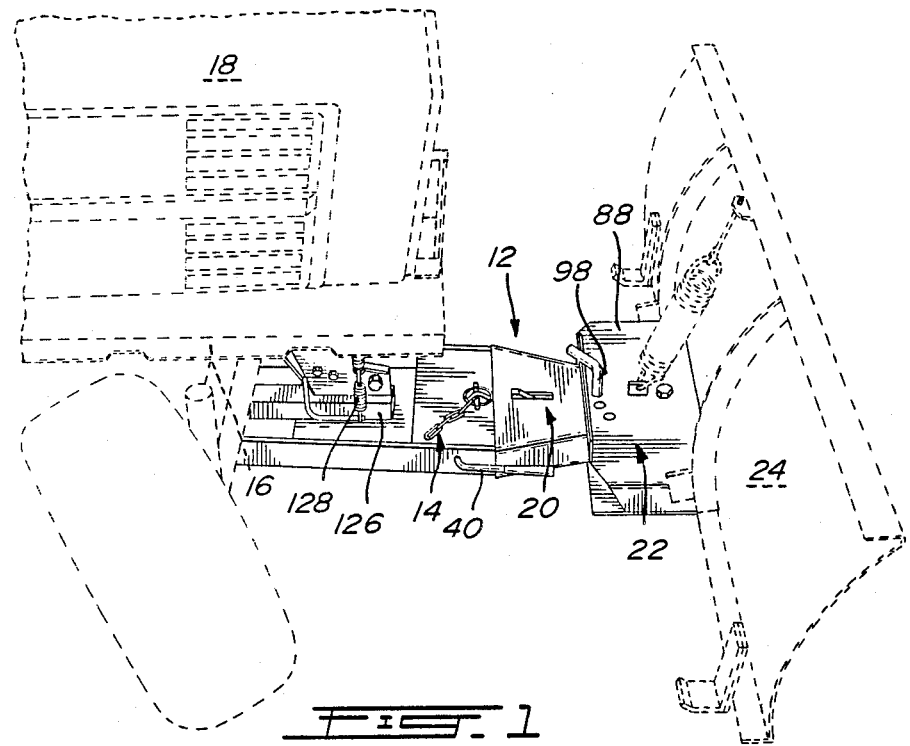
FIG. 1 is a perspective view of one embodiment of a tenon-and-mortise coupler according to the invention, operatively interconnecting the front bottom portion of a tractor chassis to the bracket assembly of a large push blade, the blade and part of the tractor shown in dotted lines.

Coupler 12 according to the invention includes a tenon portion 14, adapted to be releasably secured to the front bottom portion of the chassis 16 of a farm tractor 18, or the like vehicle, and a mortise portion 20 releasably engageable with tenon portion 14 at one end, and at the other end into the bracket assembly 22 of an implement, such as a push blade 24 (FIG. 1). Coupler tenon 14 defines a pair of sturdy elongated bars 26 (FIG. 3), interconnected at one end by a transverse, rear plate 28, and at the other end by a rigid, transverse cylindrical tube 30. Bars 26 are parallel along a main rear portion thereof 26A but at a short front end portion thereof corresponding to that of tube 30; they are converging toward each other at 26B, to form a tapered section having a total widthwise taper angle of about 30 degrees. Bar sections 26B are symmetric. Moreover, the width of bar sections 26B decreases toward tube 30, whereby the top edges 27A, 27B of bar sections 26A, 26B are coplanar but their bottom edges 27C, 27D are not, see FIG. 4. Preferably, the bottom edge 27D make a thicknesswise taper angle of about 7 degrees with top edges 27A and 27B.

Mortise portion 20 defines a hollow tapered casing 32, having a rear mouth 34 at its larger end of such a shape as to be adapted to be engaged by tenon-tapered section 26B-30-26B. The length of legs 26B represents only about half the length of mortise casing 32, whereby one half of the hollow of casing 32 is therefore free.

As best shown in FIGS. 5 and 7, the tenon portion 14 further includes crank-shaped lever 36 transversely journalled through the two bar sections 26A. Crank lever 36 has an intermediate offset section 38 and one end extending outwardly from a bar 26A and bent to form a handle 40. Thus, manual rotation of handle 40 brings lever 36 in rotation with lever offset 38 making a circle of arc.

A transverse wall 42 (FIG. 3) interconnects the pair of bar sections 26A, 26B. More particularly, wall 42 includes a front wall portion 44 interconnecting the bar top edges 27A, 27B joining with tube 30 and overlying lever 36, and a rear wall portion 46 interconnecting the bar bottom edges 27C, whereby a steeply-inclined wall portion 48 is defined therebetween.

A stirrup 50 is transversely mounted around lever 36 about lever offset 38, wherein lever 36 is movable longitudinally and rotatively therein. A rear prong 52 of an elongated latch bar 54 is inserted between and welded to the two legs 56 of stirrup 50. To the front end of latch bar 54 is fixed a double-headed pin 58, which interconnects a pair of guide plates 60 taking in sandwich latch bar 54, through angular slots 62 made in guide plates 60. The latter include diverging rear legs 60A having concave free ends 60B engaged against conforming crank lever 36, and main parallel front legs 60C, through which pin 58 extends, and having concave free ends 64 engaged against and conforming to tube 30. Therefore, guide plates 60 are retained in position by engaging tube 30 and crank lever 36 at its ends, and by the heads of pin 58 which slidably overly the outside of plates 60. A push rod 66 is slidable through web 57 of stirrup 50 and carries a push plate 72, which abuts against lever offset 38 under the bias of a compression coil spring 70 which extends between web 57 and push plate 72 and surrounds push rod 66. A stop ring 73, fixed to the rear end of rod 66, is adapted to abut against web 57 in its fully retracted-position.

Hence, it is understood that lever offset 38 is taken in sandwich between spring-biased push plate 70 and prong 52 of latch bar 54.

Latch bar 54 includes two lengthwisely-spaced upturned projections or latches 74 and 76. The rear latch 74 is a safety latch adapted to releasably engage a slot 78 in panel 44. The front latch 76 is the main latch and is adapted to releasably engage a longer slot 80 in panel 44.

Due to the shape of slots 62 and to the offset 38 of lever 36, latch bar 54 is movable during rotation of lever 36 between an inoperative retracted position, shown in dotted lines in FIG. 5, where safety latch 74 is completely retracted from slot 78, and main latch 76 is substantially flush with slot 80, to an operative position, shown in full lines in FIG. 5, where safety latch 74 protrudes from slot 78 and main latch 76 from slot 80. As shown in FIG. 4, clockwise rotation of lever 36 from the position 40a to forward position 40b of handle 40, causes latch bar 54 to move from its forward position and downward retracted position to its rearward and upward latching position. In latching position, pin 58 engages the upper horizontal leg of angular slots 62 (FIG. 5), while lever offset 38 is upwardly rearwardly inclined from the journalled portions of lever 36. When female portion 20 is engaged by male portion 14, latch 76 in its operative, retracted position will register with a long slot 82 in the top wall of casing 32. In the latching position of latch bar 54, main latch 76 abuts against the rear end 82a of slot 82 under the bias of slightly-compressed spring 70. Thus, mortise portion 20 is firmly retained over tenon portion 14, but will yield if subjected to a sudden large pulling force: part breakage is thus prevented.

By having safety pin 84 (FIG. 3) engage a throughbore 86 made in safety latch 74, so that the safety pin 84 extends over panel 44, accidental retraction of latch bar 54 is prevented.

The implement bracket assembly 22 of the first embodiment (FIGS. 1, 3) consists of an open rectangular casing 88 into which is engageable the tapered end 90 of female portion casing 32. Casing 88 is pivoted at its front intermediate section to tapered end 90 by a vertical pivot axle 92. Also, casing 88 includes a number of spaced bores 94 on its rear intermediate portion, concentric to pivot axle 92. Anyone of bores 94 is adapted to selectively register with a central sleeved bore 96 in mortise casing 32, and an L-shaped locking pin 98 is releasably engageable through the registering bores 94, 96 to lock together casings 32 and 88 at an adjusted angular angle. Thus, as best shown in FIG. 3, bracket assembly 22 and, thus, the angle of implement, such as blade 24 to the rear of which assembly 22 is fixed, can be adjusted.

Figure 2:
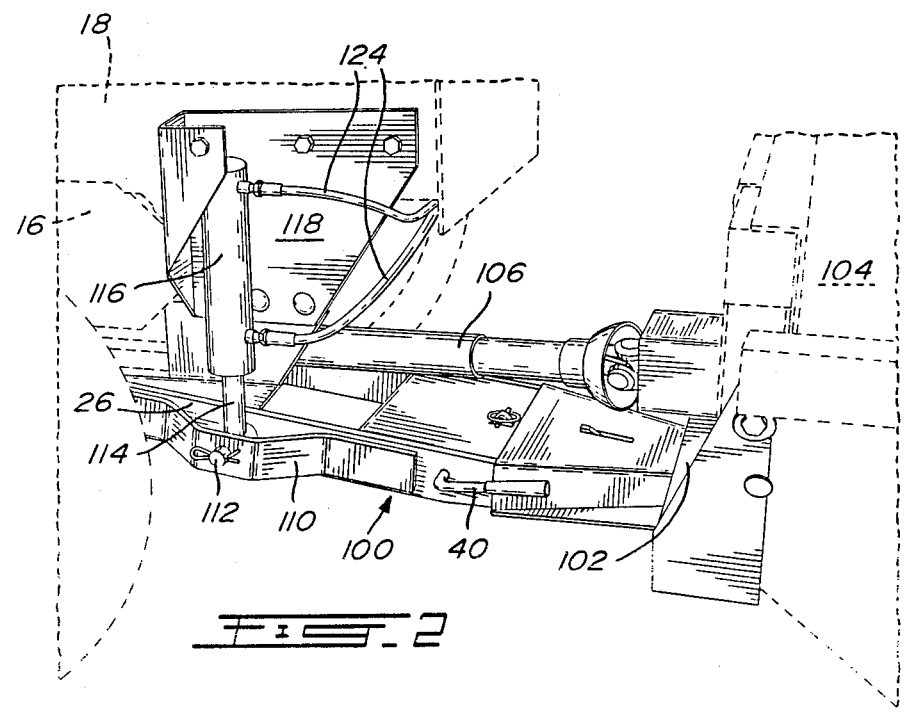
FIG. 2 is an enlarged perspective view of a second embodiment of the coupler operatively interconnecting the front bottom portion of a tractor chassis to the bracket assembly of a snowblower attachment, and the power take-off drive shaft to the snowblower impeller, the tractor and snowblower being partially shown in dotted lines.

The second embodiment of coupler of the invention is shown in FIGS. 2 and 6, and denoted 100. Coupler 100 is identical to coupler 12 but for the elements detailed connect the front chassis 16 of tractor 18 to the bracket assembly 102 of an implement, such as a snowblower accessory 104, which requires up-and-down movement and connection of the tractor power take-off by a telescopic drive shaft 106, or V-belt, connected to snowblower impeller (not shown) for driving the same. Similar tenon-and-mortise sections 14, 20 are provided; however, tenon bars 26 are further provided with yokes 110, each welded at both ends to the exterior face of a bar 26. A transverse pin 112 pivotally connects to yoke 110 and bar 26 the piston rod 114 of a double-acting hydraulic cylinder 116, the top end of which is pivotally transversely mounted on a bracket plate 118 fixed to an upper portion of tractor chassis 16.

The bars 26 are further pivotally connected at their rear end to the chassis 16 by a horizontal pivotal axle 120 at the top of an upturned rigid flange 122, each fixedly secured to bars 26. Thus, cylinders 116 fed by hydraulic lines 124, are adapted to hydraulically-control pivotal movement about axle 120 of the whole coupler 100 and associated bracket assembly 102, so as to raise snowblower 104 when not in use.

In the embodiment of FIG. 1, side bars 26 may be also be pivotally connected to the tractor chassis by axle 120 and tenon portion 14 pivotally urged to an upper limit position abutting the underside of a stop member 126 under the action of a tension spring 128.

For installation of the coupler 12 or 100, a single person, the truck driver, drives tractor 18, so that tenon part 14 engages mortise part 20. Then, he turns off the tractor engine and immobilizes the tractor; he steps down from the tractor seat; he operates handle 40 to latching position and inserts safety pin 84 into bore 86 to lock latch bar 54 in its operative position.

What I claim is:

1. A quick coupling assembly for coupling a working implement to the front of a vehicle, comprising: a tenon member and a mating a mortise member adapted to be attached one member to the implement, and the other member to the vehicle, said tenon and mortise membrs being elongated and of generally rectangular cross-section and disposed generally horizontally, both transversely and longitudinally with the width and thickness thereof corresponding to the larger and smaller dimensions of said rectangular cross-section, respectively, both tenon and mortise members having complementary surfaces which taper both widthwise and thicknesswise, and which interfit in the coupled position of said members, said mortise member forming a casing having a mouth at its larger end and having a top wall; latching means to latch said tenon member within said mortise member in the coupled position of the same; and spring means acting on said latching means to cause the latter to bias said tenon member and mortise member in coupled position.

2. A quick coupling assembly as defined in claim 1, wherein said latching means include a longitudinally-extending slot made in the top wall of said casing, one end of said slot being nearer said mouth than the other end thereof, and a longitudinally-extending latch bar mounted within said tenon member for guided, combined longitudinal and vertical movement between a lower retracted position and an upper latching position, said latch bar having an upwardly-extending latching extension which, in the retracted position of said latch bar, does not protrude from the top face of said tenon member, and which, in the latching position of said latch bar, protrudes from the top face of said tenon member and has an edge engaging said one end of said slot; and further including manually-operated means to move said latch bar between retracted and latching positions.

3. A quick coupling assembly as defined in claim 2, wherein said manually-operated means include a crank lever extending across and journalled within said tenon member, having an operating handle on the outside of said tenon member and an offset lever section within said tenon member rotatably engaging said latch bar at one end portion of the same, whereby rotation of said crank lever between a first and a second position in which the latch bar is in retracted and in latching position, respectively, produces combined longitudinal and vertical movement of said one end portion of said latch bar; and further including a pair of longitudinally-extending guide plates carred within said tenon member and disposed on each side of said latch bar for guiding the longitudinal and upward movement of the same, the other end portion of said latch bar carrying a transverse pin extending through angular slots made in said guide plates, each slot having a downwardly-inclined first portion extending from a generally horizontal second portion, said pin disposed at the lower end of said first portion of said guide slots in the retracted position of said latch bar and in the end of said horizontal slot portion in the latching position of said latch bar.

4. A quick coupling assembly as defined in claim 3, wherein said pin is double headed with its heads engaging the outer faces of said guide plates, said guide plates having outer sections parallel to each other and disposed on each side of said latch bar and outwardly inclined inner sections rotatably abutting against the journalled portions of said crank lever, said tenon member including an outer transversely-extending tube, the outer ends of said guide plates being convex and conforming to said tube and releasably receiving said tube.

5. A quick coupling assembly as defined in claim 4, wherein said large bar includes an upwardly extending latch member constituting a safety latch member disposed spacedly of said latching extension, said safety latch member protruding from said top wall of said casing in the latching position of said latch bar, said safety latch member having a hole at its upper end for receiving a retaining member to prevent accidental unlatching movement of said latch bar.

6. A quick coupling assembly as defined in claim 3, further including a yoke member secured to said one end portion of said latch bar and surrounding said lever offset section, a push plate guidingly mounted on said yoke member for movement towards and away from said levler offset section, said pusher plate and one end portion of said latch bar abutting diametrically opposite portions of said section, said spring means consisting of a compression spring extending within said yoke between the cross leg of the same and said pusher plate, to bias said pusher plate against said lever offset section, so as to permit longitudinal movement of said latch bar away from said lever offset section against the bias of said spring, said spring urging said one end portion of said latch bar against said lever offset section; said spring further urging said edge of said latching extension into engagement with said one end of said slot when said crank lever is in its second rotated position.

7. A quick coupling assembly as defined in claim 1, wherein the widthwise taper angle of said members is about 30 degrees, while the thicknesswise taper angle of said members is about 7 degrees.

8. A quick coupling assembly as defined in claim 7, wherein said complementary surfaces include a top, a bottom and two side surfaces for each member; and wherein the thicknesswise taper angle of said members is solely formed by said complementary bottom surfaces; and the widthwise taper angle of said members is formed by the symmetrical convergence of said complementary side surfaces.

* * * * *